(12) United States Patent
Fujita et al.

(10) Patent No.: US 8,075,868 B2
(45) Date of Patent: Dec. 13, 2011

(54) IRON ARSENATE POWDER

(75) Inventors: Tetsuo Fujita, Akita (JP); Takashi Nakamura, Miyagi (JP); Shigeru Suzuki, Miyagi (JP); Kozo Shinoda, Miyagi (JP)

(73) Assignees: Dowa Metals & Mining Co., Ltd., Tokyo (JP); Tohoku University, Miyagi (JP)

( * ) Notice: Subject to any disclaimer, the term of this patent is extended or adjusted under 35 U.S.C. 154(b) by 0 days.

(21) Appl. No.: 12/672,693

(22) PCT Filed: Aug. 22, 2008

(86) PCT No.: PCT/JP2008/065474
§ 371 (c)(1),
(2), (4) Date: Feb. 9, 2010

(87) PCT Pub. No.: WO2009/028636
PCT Pub. Date: Mar. 5, 2009

(65) Prior Publication Data
US 2011/0027167 A1    Feb. 3, 2011

(30) Foreign Application Priority Data

Aug. 24, 2007   (JP) ................. 2007-218855

(51) Int. Cl.
*C22B 30/00*  (2006.01)
(52) U.S. Cl. ......................... 423/602; 423/87
(58) Field of Classification Search ............ 423/87, 423/602
See application file for complete search history.

(56) References Cited

U.S. PATENT DOCUMENTS
1,376,153 A  *  4/1921  Moore ..................... 424/620

FOREIGN PATENT DOCUMENTS

| JP | 53123368 A | 10/1978 |
| JP | 61024329 B | 6/1986 |
| JP | 11277075 A | 10/1999 |
| JP | 2000219920 A | 8/2000 |
| JP | 2005161123 A | 6/2005 |
| SU | 1662938 | * 7/1991 |
| SU | 1730039 | * 4/1992 |
| WO | 01/23628 | * 4/2001 |

OTHER PUBLICATIONS

Van Weert, et al. "Aqueous Processing of Arsenic Trioxide to Crystalline Scorodite" Jun. 1994, JOM, 46(6), pp. 36-38.*

(Continued)

*Primary Examiner* — Steven Bos
(74) *Attorney, Agent, or Firm* — Bachman & LaPointe, P.C.

(57) ABSTRACT

There is provided an iron arsenate powder which is produced from an arsenic containing solution and wherein the concentration of arsenic eluted or released from the powder is very low. The iron arsenate powder is a powder of dihydrate of iron arsenate, which has a crystal structure of rhombic system and which has lattice constants of a=0.8950 to 0.8956 nm, b=1.0321 to 1.0326 nm and c=1.0042 to 1.0050 nm at room temperatures and atmospheric pressure. The iron arsenate powder can be produced by a method comprising the steps of: adding ferrous ions to an arsenic containing solution to cause the molar ratio (Fe/As) of iron to arsenic in the solution to be not lower than 1; adding an oxidizing agent to the solution; heating the solution to a temperature of not lower than 70° C. while stirring the solution, to allow a reaction; and carrying out a solid-liquid separation to wash the obtained solid part.

2 Claims, 1 Drawing Sheet

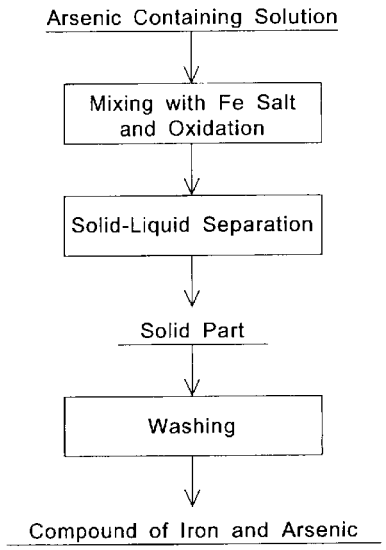

OTHER PUBLICATIONS

Droppert, et al. "Ambient pressure production of crystalline scorodite from arsenic-rich metallurgical effluent solutions" Feb. 1996, pp. 227-239, Min. Metals & Materials Society, EPD Congress.*

E. Krause et al.; "Solubilities and Stabilities of Ferric Arsenate Compounds"; Hydrometallurgy, vol. 22, 1989, pp. 311-337; XP002615158, Elsevier Science Publishers B.V., Amsterdam.

* cited by examiner

FIG.1

Arsenic Containing Solution

↓

Mixing with Fe Salt and Oxidation

↓

Solid-Liquid Separation

↓

Solid Part

↓

Washing

↓

Compound of Iron and Arsenic

IRON ARSENATE POWDER

TECHNICAL FIELD

The present invention relates generally to an iron arsenate powder. More specifically, the invention relates to an iron arsenate powder produced from a high purity and high concentration arsenic containing solution, such as an arsenic containing solution obtained by treating an arsenic containing substance which contains various elements in addition to arsenic, such as intermediate products in non-ferrous metal smelting or refining processes.

BACKGROUND ART

Various intermediate products and raw materials produced in non-ferrous metal smelting or refining processes contain unfavorable elements, such as arsenic, although they contain valuable metals.

As a conventional method for leaching, separating and recovering arsenic from arsenic containing intermediate products in smelting or refining processes, there has been proposed a method for separating arsenic from an arsenic containing intermediate product by a wet reaction to recover an arsenic containing solution (see, e.g., Japanese Patent Publication No. 61-24329). There is also proposed a method for removing and fixing arsenic, which exists in an iron arsenate solution, as a stable crystalline compound of iron and arsenic, which does not elute or release metals (see, e.g., Japanese Patent Laid-Open No. 11-277075). In addition, there is proposed a method for adding at least one of an iron (II) solution and an iron (III) solution to an arsenic containing solution to allow a reaction to form Scorodite ($FeAsO_4 \cdot 2H_2O$) to carry out a solid-liquid separation to recover the Scorodite, which contains non-ferrous metals including copper, to add water to the obtained Scorodite, which contains the non-ferrous metals including copper, to carry out repulping to dissolve the non-ferrous metals including copper, which are contained in the Scorodite, in the solution to separate the non-ferrous metals including copper from the Scorodite (see, e.g., Japanese Patent Laid-Open No. 2000-219920). Moreover, there is proposed a method for leaching arsenic from an arsenic containing flue cinder with an acid solution to mix the leached arsenic containing solution with an aqueous acidic solution containing iron ions to precipitate amorphous ferric arsenate ($FeAsO_4$) to heat the mixed solution to crystallize the amorphous ferric arsenate to filter the mixed solution to remove the crystallized ferric arsenate (see, e.g., Japanese Patent Laid-Open No. 2005-161123).

Japanese Patent Publication No. 61-24329 has proposed the method for recovering an arsenic containing solution, but it does not propose a method for fixing the recovered arsenic containing solution as a stable substance which does not elute metals. In addition, it is desired to form a compound of iron and arsenic which is more stable and is more difficult to elute metals than conventional compounds of iron and arsenic produced by the methods proposed in Japanese Patent Laid-Open Nos. 11-277075, 2000-219920 and 2005-161123. Particularly, there is a problem in that it takes a lot of time to carry out the method proposed in Japanese Patent Laid-Open No. 2005-161123, since amorphous iron arsenate is crystallized after the amorphous iron arsenate is precipitated.

DISCLOSURE OF THE INVENTION

It is therefore an object of the present invention to eliminate the aforementioned conventional problems and to provide an iron arsenate powder which is produced from an arsenic containing solution and which has a very low concentration of arsenic eluted or released from the powder.

In order to accomplish the aforementioned object, the inventors have diligently studied and found that the concentration of arsenic eluted or released from an iron arsenate powder is very low if the iron arsenate powder has a crystal structure of rhombic system and has lattice constants of a=0.8950 to 0.8956 nm, b=1.0321 to 1.0326 nm and c=1.0042 to 1.0050 nm at room temperatures and atmospheric pressure. Thus, the inventors have made the present invention.

That is, an iron arsenate powder according to the present invention has a crystal structure of rhombic system and has lattice constants of a=0.8950 to 0.8956 nm, b=1.0321 to 1.0326 nm and c=1.0042 to 1.0050 nm at room temperatures and atmospheric pressure. The iron arsenate powder is preferably a powder of dihydrate of iron arsenate.

According to the present invention, it is possible to produce an iron arsenate powder from an arsenic containing solution, the concentration of arsenic eluted or released from the produced iron arsenate powder being very low. In particular, it is possible to produce an iron arsenate powder, the concentration of arsenic eluted or released from the powder being far lower than 0.3 mg/L which is a reference value of concentration of eluted or released arsenic.

BRIEF DESCRIPTION OF THE DRAWINGS

FIG. 1 is a process drawing which schematically shows a method for producing the preferred embodiment of an iron arsenate powder according to the present invention.

BEST MODE FOR CARRYING OUT THE INVENTION

The preferred embodiment of an iron arsenate powder according to the present invention has a crystal structure of rhombic system and has lattice constants of a=0.8950 to 0.8956 nm, b=1.0321 to 1.0326 nm and c=1.0042 to 1.0050 nm at room temperatures and atmospheric pressure. The iron arsenate powder is preferably a powder of dihydrate of iron arsenate.

For example, as shown in FIG. 1, such an iron arsenate powder can be produced by a method comprising the steps of: adding ferrous ions to an arsenic containing solution to cause the molar ratio (Fe/As) of iron to arsenic in the solution to be not lower than 1; adding an oxidizing agent to the solution; heating the solution to a temperature of not lower than 70° C. while stirring the solution, to allow a reaction; and then, carrying out a solid-liquid separation to wash the obtained solid part.

If the concentration of As is low in the arsenic containing solution, it tends to be difficult to increase the grain size of the compound of Fe and As during the growth of the compound after the deposition of the compound. Therefore, the concentration of As is preferably 10 g/L or higher, and more preferably 20 g/L or higher. In addition, the pH of the arsenic containing solution is preferably 2 or lower.

As the ferrous ion source, soluble $FeSO_4 \cdot 7H_2O$ is preferably used. The molar ratio (Fe/As) of iron to arsenic in the solution is preferably 1 or higher, and more preferably in the range of from about 1.0 to about 1.5.

As the oxidizing agent, any one of oxidizing agents capable of oxidizing $Fe^{2+}$ may be used, and oxygen gas may be used. Although air may be used, the oxidizing performance of air is slightly lower than that of oxygen gas. Therefore, if air is used, the oxidizing performance may be improved by using a catalyst, such as Cu.

If the reaction temperature is 50° C. or higher, the compound of Fe and As can be deposited. In order to decrease the concentration of eluted As, the reaction temperature is preferably 70° C. or higher, and more preferably in the range of from about 80° C. to about 95° C.

After the powder thus obtained was analyzed by X-ray diffraction, it was found that the powder was a powder of dihydrate of ferric arsenate ($FeAsO_4 \cdot 2H_2O$).

Examples of an iron arsenate powder according to the present invention will be described below in detail.

EXAMPLE 1

First, an arsenic solution (reagent produced by Wako Junyaku Kogyo, Co., Ltd.) having an arsenic concentration (quinquevalent arsenic ion concentration) of 500 g/L was diluted with pure water to prepare an arsenic solution having an arsenic concentration of 10 g/L. Then, heptahydrate of ferrous sulfate ($FeSO_4 \cdot 7H_2O$) (reagent produced by Wako Junyaku Kogyo, Co., Ltd.) was diluted with pure water to prepare a ferrous sulfate solution having an iron concentration (ferrous ion concentration) of 11.18 g/L.

Then, the arsenic solution and the ferrous sulfate solution thus prepared are mixed to prepare 0.7 L of a mixed solution having a molar ratio (Fe/As) of 1.5. The mixed solution thus prepared was placed in a 2 L glass beaker in which a double turbine disk and four baffle plates were set.

Then, while the mixed solution was strongly stirred by rotating the double turbine disk at 800 rpm, the solution was heated to hold the temperature thereof at 95° C., and oxygen gas having a purity of 99% was blown into the solution at a flow rate of 4.0 L/min to allow the solution to react at atmospheric pressure for three hours while holding the temperature, stirring conditions and flow rate of oxygen gas. After the temperature of a mixed slurry containing precipitates obtained by the reaction was lowered to 70° C., filtration was carried out to recover a solid part.

Then, pure water was added to the recovered solid part (wet cake) to cause the pulp density to be 100 g/L, and then, repulping washing was carried out for one hour while stirring the solution by rotating the double turbine disk at 500 rpm using the four baffle plates. Then, filtration was carried out at 30° C. to recover a solid part, and then, the recovered solid part was dried at 60° C. for 18 hours to obtain a powder.

The powder X-ray diffraction, moisture percentage content, mean particle size and specific surface area of the powder thus obtained were measured. As a result, the obtained powder had a crystal of Scorodite type iron arsenate having a crystal structure of rhombic system, and the moisture percentage content was 12%. The mean particle size was 20.41 μm, and the specific surface area was 0.25 $m^2/g$ (BET one-point method).

Furthermore, a laser diffraction type particle size distribution measuring apparatus (LA-500 produced by Horiba Seisakusho, Co., Ltd.) was used for measuring a particle size distribution to obtain a median diameter as the mean particle size.

In the measurement of the powder X-ray diffraction, a filling X-ray vessel using a copper target was used as a radiation source, and a divergent beam integrated optical system diffractometer was used. In addition, diffraction X-rays from a sample were changed to monochromatic rays by means of a graphite counter monochromator, and CuK characteristic lines were counted. Moreover, in the determination of the lattice constants of the obtained powder (iron arsenate powder), the total diffraction pattern resolution fitting (R. W. Cheary and A. Coelho "A Fundamental Parameters Approach to X-ray Line-Profile Fitting", J. Appl. Cryst. 25, pp 109-121 (1992)) was carried out by the Pawley method (G. S. Pawley "Unit-Cell Refinement From Powder Diffraction Scans", J. Appl. Cryst. 14, pp 357-361 (1981)) in view of the device constants with the profile function fitting of diffraction peaks based on a basic parameter method. Furthermore, the crystal structure of iron arsenate is a rhombic system which is indicated by lattice constants a, b and c (unit: nm). The precision of the measured lattice constants a, b and c is ±0.0001 nm which is a sufficient precision for evaluating the lattice constants of iron arsenate.

The concentration of arsenic, which is eluted from the obtained iron arsenate powder, in an aqueous solution is an important factor for evaluating the stability of the iron arsenate powder. On the basis of Bulletin No. 13 of the Ministry of the Environment of Japan, the concentration of eluted arsenic was evaluated by the eluted metal content test for analyzing the concentration of arsenic in a solution obtained by filtering using a filter having a pore size of 0.45 μm after mixing the obtained iron arsenate powder with water of pH6 in a mass ratio of 1:10 and shaking the mixture for six hours by a shaker. In this evaluation of the concentration of eluted arsenic, it was evaluated that the concentration was low if it was not higher than 0.3 mg/L and that the concentration was high if it was higher than 0.3 mg/L.

As a result, as shown in Table 1, in this example, the lattice constants of the crystal structure of the obtained iron arsenate powder were a=0.8951 nm, b=1.0322 nm and c=1.0043 nm, and the concentration of arsenic eluted from the iron arsenate powder was low.

TABLE 1

|  | Lattice Constant a (nm) | Lattice Constant b (nm) | Lattice Constant c (nm) | Concentration of Eluted Arsenic (mg/L) |
| --- | --- | --- | --- | --- |
| Ex. 1 | 0.8951 | 1.0322 | 1.0043 | 0.01 |
| Ex. 2 | 0.8952 | 1.0321 | 1.0047 | 0.02 |
| Ex. 3 | 0.8952 | 1.0322 | 1.0047 | 0.02 |
| Ex. 4 | 0.8953 | 1.0323 | 1.0048 | 0.02 |
| Ex. 5 | 0.8954 | 1.0325 | 1.0048 | 0.01 |
| Ex. 6 | 0.8955 | 1.0324 | 1.0049 | 0.01 |
| Comp. 1 | 0.8943 | 1.0276 | 1.0061 | 0.48 |
| Comp. 2 | 0.8941 | 1.0280 | 1.0059 | 2.45 |

EXAMPLES 2-4

Powders were obtained by the same method as that in Example 1, except that a mixed solution obtained by mixing an arsenic solution having an arsenic concentration of 20 g/L with a ferrous sulfate solution having an iron concentration of 22.36 g/L was used in Example 2, that a mixed solution obtained by mixing an arsenic solution having an arsenic concentration of 30 g/L with a ferrous sulfate solution having an iron concentration of 33.55 g/L was used in Example 3, and that a mixed solution obtained by mixing an arsenic solution having an arsenic concentration of 50 g/L with a ferrous sulfate solution having an iron concentration of 55.91 g/L was used in Example 4. Then, the lattice constants and characteristics of the powders thus obtained were examined by the same method as that in Example 1.

As a result, as shown in Table 1, the lattice constants of the crystal structure of the obtained powder (iron arsenate powder) were a=0.8952 nm, b=1.0321 nm and c=1.0047 nm in Example 2; a=0.8952 nm, b=1.0322 nm and c=1.0047 nm in Example 3; and a=0.8953 nm, b=1.0323 nm and c=1.0048 nm in Example 4. In all of Examples 2-4, the concentration of arsenic eluted from the iron arsenate powder was low.

EXAMPLE 5

A powder obtained by the same method as that in Example 1, except that the reaction time was seven hours. Then, the lattice constants and characteristics of the powder thus obtained were examined by the same method as that in Example 1.

As a result, as shown in Table 1, the lattice constants of the crystal structure of the obtained powder (iron arsenate powder) were a=0.8954 nm, b=1.0325 nm and c=1.0048 nm, and the concentration of arsenic eluted from the iron arsenate powder was low.

EXAMPLE 6

A powder obtained by the same method as that in Example 1, except that 4 L of the same mixed solution as that in Example 1 was prepared to be placed in a 5 L glass beaker. Then, the lattice constants and characteristics of the powder thus obtained were examined by the same method as that in Example 1.

As a result, as shown in Table 1, the lattice constants of the crystal structure of the obtained powder (iron arsenate powder) were a=0.8955 nm, b=1.0324 nm and c=1.0049 nm, and the concentration of arsenic eluted from the iron arsenate powder was low.

COMPARATIVE EXAMPLE 1

A powder obtained by the same method as that in Example 1, except that a polyvalent iron solution having an iron concentration (ferric ion concentration) of 53.77 g/L was used in place of the ferrous sulfate solution in Example 1, that a closed vessel was used in place of the glass beaker, that oxygen gas was blown into the solution so that the partial pressure of $O_2$ was 0.3 MPa, and that an autoclave was used for allowing the reaction at 175° C. for five hours. Then, the lattice constants and characteristics of the powder thus obtained were examined by the same method as that in Example 1.

As a result, as shown in Table 1, the lattice constants of the crystal structure of the obtained powder (iron arsenate powder) were a=0.8943 nm, b=1.0276 nm and c=1.0061 nm, and the concentration of arsenic eluted from the iron arsenate powder was high.

COMPARATIVE EXAMPLE 2

A powder obtained by the same method as that in Example 1, except that an arsenic solution having an arsenic concentration (trivalent arsenic ion concentration) of 47.97 g/L was used in place of the arsenic solution in Example 1, that a polyvalent iron solution having an iron concentration (ferric ion concentration) of 53.77 g/L was used in place of the ferrous sulfate solution in Example 1, that a closed vessel was used in place of the glass beaker, that oxygen gas was blown into the solution so that the partial pressure of $O_2$ was 0.3 MPa, and that an autoclave was used for allowing the reaction at 175° C. for five hours. Then, the lattice constants and characteristics of the powder thus obtained were examined by the same method as that in Example 1.

As a result, as shown in Table 1, the lattice constants of the crystal structure of the obtained powder (iron arsenate powder) were a=0.8941 nm, b=1.0280 nm and c=1.0059 nm, and the concentration of arsenic eluted from the iron arsenate powder was high.

As can be seen from the results in these examples and comparative examples, it is found that, if an iron arsenate powder has a crystal structure of rhombic system and has lattice constants of a=0.8950 to 0.8956 nm, b=1.0321 to 1.0326 nm and c=1.0042 to 1.0050 nm at room temperatures and atmospheric pressure as Examples 1-5, the iron arsenate powder is suitable for stable storage since the concentration of arsenic eluted from the powder is low, whereas if the lattice constants of an iron arsenate powder are beyond the above-described ranges as Comparative Examples 1-2, the iron arsenate powder is not suitable for stable storage since the concentration of arsenic eluted from the powder is high.

The invention claimed is:

1. An iron arsenate powder which has a crystal structure of rhombic system and which has lattice constants of a=0.8950 to 0.8956 nm, b=1.0321 to 1.0326 nm and c=1.0042 to 1.0050 nm at room temperatures and atmospheric pressure.

2. An iron arsenate powder as set forth in claim 1, wherein said iron arsenate powder is a powder of dihydrate of iron arsenate.

* * * * *